United States Patent
Victor (10) Patent No.: US 6,988,622 B1
(45) Date of Patent: Jan. 24, 2006

(54) VENTURI-DRIVEN FLOTATION SEPARATOR FOR CHILI PEPPERS

(75) Inventor: John L. Victor, Pearce, AZ (US)

(73) Assignee: Curry Seed and Chili Co., Pearce, AZ (US)

( * ) Notice: Subject to any disclaimer, the term of this patent is extended or adjusted under 35 U.S.C. 154(b) by 137 days.

(21) Appl. No.: 10/420,604

(22) Filed: Apr. 22, 2003

(51) Int. Cl.
B03B 5/64 (2006.01)
B03B 5/62 (2006.01)
B03B 5/28 (2006.01)
A23N 4/24 (2006.01)
A23N 15/00 (2006.01)

(52) U.S. Cl. .................. 209/162; 209/17; 209/156; 209/173; 426/481

(58) Field of Classification Search ............... 209/162, 209/17, 156, 173; 426/481
See application file for complete search history.

(56) References Cited

U.S. PATENT DOCUMENTS

| | | | |
|---|---|---|---|
| 719,948 A | 2/1903 | Merriam | |
| 1,025,231 A * | 5/1912 | Anderson | 209/173 |
| 1,312,098 A * | 8/1919 | Cerruti | 209/173 |
| 1,544,999 A | 7/1925 | Lequeux | |
| 1,615,700 A | 1/1927 | Howard et al. | |
| 1,757,103 A | 5/1930 | Voigt | |
| 1,822,276 A | 9/1931 | Dunkley | |
| 1,835,634 A | 12/1931 | Chapman | |
| 2,035,118 A | 3/1936 | Falkiner | |
| 2,040,569 A * | 5/1936 | Schmidt et al. | 209/173 |
| 2,198,390 A * | 4/1940 | Olney | 209/173 |
| 2,262,465 A * | 11/1941 | Olney | 209/173 |
| 2,422,657 A | 6/1947 | Cleveland | |
| 2,501,909 A * | 3/1950 | Olney | 209/173 |
| 2,571,056 A * | 10/1951 | Olney | 209/173 |
| 2,590,756 A * | 3/1952 | Colin et al. | 209/173 |
| 2,723,199 A | 11/1955 | Todd | |
| 2,945,589 A * | 7/1960 | Olney | 209/164 |
| 3,430,764 A | 3/1969 | Hensley | |
| 3,567,017 A * | 3/1971 | Hughes et al. | 209/156 |
| 3,869,559 A | 3/1975 | Clark | |
| 4,059,604 A | 11/1977 | Kresse | |

(Continued)

FOREIGN PATENT DOCUMENTS

GB 1053159 7/1965

OTHER PUBLICATIONS

Parks et al., "The Influence of Hydrocyclone Geometry on Separation Performance".

(Continued)

Primary Examiner—Thomas M. Lithgow
(74) Attorney, Agent, or Firm—Quarles & Brady Streich Lang LLP (57) ABSTRACT

Mechanically harvested chili-pepper plants are sized into chunks and introduced into a water flotation system. Water is added at the top of a flotation vat and, for the most part, is withdrawn at the bottom using a venturi unit. The balance of the water is recovered as spillover from the top of the vat carrying the floating material. If the rate of water withdrawal at the bottom of the vessel is controlled such that it is as high as possible but less than what produces turbulence in the vat, the pulp material will drop with heavy seeds to the bottom with the extracted water while all other materials are skimmed away at the top. The very small differential in density between the pepper pulp and the rest of the plant and debris is sufficient to separate them under these specific conditions.

5 Claims, 6 Drawing Sheets

U.S. PATENT DOCUMENTS

| | | |
|---|---|---|
| 4,169,165 A | 9/1979 | Veri |
| 4,169,787 A | 10/1979 | Gunnerson |
| 4,174,314 A | 11/1979 | Garrison |
| 4,215,040 A | 7/1980 | Hager |
| 4,259,179 A | 3/1981 | Marvin |
| 4,750,995 A | 6/1988 | Forgerson |
| 4,946,584 A * | 8/1990 | Olney ........................ 209/18 |
| 5,039,534 A * | 8/1991 | Adams et al. ............. 426/231 |
| 5,305,888 A | 4/1994 | Meylor et al. |
| 6,293,407 B1 * | 9/2001 | Bajema ...................... 209/495 |

OTHER PUBLICATIONS

Arterburn, Richard A., "The Sizing and Selection of Hydrocyclones".

* cited by examiner

VENTURI-DRIVEN FLOTATION SEPARATOR FOR CHILI PEPPERS

BACKGROUND OF THE INVENTION

1. Field of the Invention

This invention in general is related to equipment for separating plant materials according to their relative capacity for floating in water. In particular, it pertains to flotation apparatus for extracting clean chili-pepper pulp from seeds, stems, leaves, branches, and other debris.

2. Description of the Related Art

The principle of flotation has been known and utilized in separation processes for a long time. In essence, the difference in the capacity of different materials to float in a given fluid is exploited in order to separate them. If one material remains afloat while all others sink, that material can easily be extracted from the others by skimming the surface of the fluid. Similarly, if one material sinks while the others float, it can be separated by withdrawing the material from the bottom of the process vessel.

Clearly, the difference in density between materials in a mixture is an important factor in any flotation process, but other factors affect process performance, such as particle porosity (which may produce changes in the effective specific gravity of the material during the flotation process), particle shape, size, and surface tension of the liquid. Accordingly, over decades of experimentation, chemical and mechanical agents have been developed to improve specific flotation processes for various industrial applications. For example, chemicals that enhance the flotation of a particular material in a mixture are used routinely to extract valuable products in the mining industry. Similarly, air sparging has been used to improve the flotation separation of materials in the food industry. U.S. Pat. No. 4,059,604 (1977), U.S. Pat. No. 4,174,314 (1979), U.S. Pat. No. 4,215,040 (1980) and U.S. Pat. No. 5,305,888 (1994) are examples of flotation processes developed for separating vegetable products from other undesirable plant material.

With reference to chili peppers, their commercial value lies in the pulp, which is the raw material for several chili-pepper consumer products, and in the seeds, which are sold to agricultural producers of the fruit. Thus, the commercial processing of chili peppers necessarily involves the separation of pulp and seeds from the rest of the plant and from other materials that may be collected during harvesting of the pepper. Attempts have been made to harvest peppers by machine, which requires collecting stems and branches with the peppers, and then to separate the pulp and seeds from the rest of the plant using flotation and/or pneumatic equipment, but these experiments have not been successful. The separation has been very difficult to accomplish with conventional flotation techniques because of the very similar density of the fruit parts and the rest of the plant. Thus, in practice, as much as possible of the separation of the fruit from the plant is accomplished by humans at harvest time. The pepper is picked by hand ensuring that as little extraneous material as possible is included, it is crushed into pieces, and then the pulp and seeds are isolated from the rest of the fruit material through a dry screening process.

The cost of harvesting chili peppers by hand is becoming increasingly prohibitive in the United States because of its relatively significant incidence on the overall cost of production of chili-pepper products. In today's world economy, where labor costs are often markedly lower in other countries, it is more and more difficult for U.S. producers to compete with chili-pepper products imported from those countries. Accordingly, any cost improvement in the production cycle of chili peppers would provide a strongly needed form of relief for U.S. producers. In particular, there is an urgent need for a solution to the problem associated with the high cost of harvesting chili peppers by hand.

BRIEF SUMMARY OF THE INVENTION

In view of the foregoing, the present invention is directed at an improved flotation process that enables the separation of chili-pepper pulp and seeds from all other plant parts, such as stems, branches and leaves. If this general objective is achieved, commercial producers will be able to harvest chili peppers mechanically with conventional equipment and tolerate the unavoidable entrainment of the entire plant and foreign debris with the chili-pepper fruit. The ability to accept mechanically harvested product in the normal processing cycle of chili peppers will greatly reduce overall production costs and will advantageously balance the competitive effect of low labor costs.

The invention consists of a process and related apparatus for separating pulp and seed from all other material in a water flotation system after the product of mechanically harvested chili-pepper plants has been crushed into chunks. Water is added at one end of the top of a deep flotation vat and, for the most part, is withdrawn at the bottom with the chili-pepper pulp and a portion of the seeds. The balance of the water is recovered from another end of the top of the vat, where it spills over carrying the rest of the fruit and plant material, including the balance of the seed material. According to one aspect of the invention, water is withdrawn from the bottom of the flotation vessel at a flow rate approaching the maximum possible while maintaining laminar flow in the vessel. Although the chili-pepper pulp and the rest of the plant material (with the exception of the heavier seeds) have very similar densities, if the rate of water withdrawal at the bottom of the vessel is controlled such that it is as high as possible but less than what produces turbulence in the vat, the pulp material will drop to the bottom with the extracted water and the heavier seeds while all other materials are skimmed away at the top. In essence, the very small differential in density between the pepper pulp and the rest of the plant and debris is sufficient to separate them under these specific conditions. If the rate of withdrawal is slower than described, the pulp will not be separated sufficiently for the process to be useful. If the rate is fast enough to cause turbulence, the lighter seeds, stems, branches, and other debris will also be drawn down with the pulp and the heavier seeds and the desired separation will not take place.

It is noted that the specific gravity of the various parts of a chili-pepper plant varies according to moisture content, degree of maturation, and other environmental factors; therefore, it changes with time. As a result, different operating conditions may be optimal at different times for the process of the invention. Thus, the ability to control the delicate balance in the character of the flow produced in the vat by the bottom effluent between maximum laminar flow, which is preferred, and turbulent flow, which is unacceptable, is critical to the invention. According to another aspect of the invention, the withdrawal of the lower effluent from the flotation vessel is implemented using a venturi system that draws out water and pulp from the bottom of the vessel and provides fine control of the flow rate working against a water head that is substantially equal to the depth of the flotation vessel. The system allows fine tuning of the bottom-effluent rate within the laminar/turbulent transition range, such that the operating conditions of the process may be varied as needed to attain the desired separation for different raw materials and environmental circumstances. By judiciously adjusting the operation of the venturi component of the system, the rate of water withdrawal at the bottom of the flotation vessel can be varied as needed to approach the upper limit of laminar flow while ensuring that turbulence is avoided, thereby achieving the desired separation of the chili-pepper pulp and heavier seeds from all other materials in the water under a variety of processing conditions.

According to yet another aspect of the invention, the top effluent from the flotation vessel is put through a set of screens to separate the lighter chili-pepper seeds from the rest of the floating material. The same is done with the bottom effluent to separate the pulp from the heavier seeds. Because the harvested fruit and plant materials are initially crushed into pieces in the order of inches, the smaller seeds are easily isolated by appropriately sized screens, thereby also separating this useful product from the rest of the plant material. The seeds are then washed, if necessary, and dried in conventional manner.

By making it possible to separate the pulp and seeds of chili peppers from the rest of the plant and debris material collected by a mechanical harvester, this invention provides an opportunity for reducing the overall cost of manufacture of chili-pepper products in a material way. In the U.S., the cost of mechanical harvesting is approximately ten times lower than the cost associated with picking chili peppers manually from plants in the fields. This difference and its incidence on the overall cost of production of chili-pepper products materially affect the competitive position of producers and the desired objective of neutralizing the advantages provided by materially less expensive labor costs is achieved.

Various other purposes and advantages of the invention will become clear from its description in the specification that follows and from the novel features particularly pointed out in the appended claims. Therefore, for the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the recognition that a flotation process may be substantially improved to achieve the separation of materials with very close specific gravity by increasing the rate of withdrawal of bottom effluent to the transition limit between laminar and turbulent flow. Moreover, a venturi unit is used in a novel application in order to enable the fine tuning of the bottom-effluent flow rate necessary for achieving the desired upper limit of laminar flow.

The invention is described with reference to chili-pepper processing because it was develop to solve the particularly acute problem created in this industry by the availability of low harvesting labor costs in competing foreign countries, but it is anticipated that it could be used advantageously for separating other similar-density materials in equivalent fashion. For example, it would be reasonable to expect that the separation of pulp and seeds from other materials in the processing of other pepper plants could be carried out in similar fashion. The principle of the invention remains the same and is believed to be applicable to all situations where the objective is the separation by flotation of two materials with very close densities. Accordingly, the invention is not intended to be limited to chili-pepper processing.

The chili-pepper plant is a woody vine with leaves that produces fruit in the form of peppers. Each pepper consists of an outer, edible pulp attached to a stem in the vine through the calix of the flower that yielded the fruit. The interior of the pepper includes the placenta of the fruit, the soft material that is attached to and is normally discarded with the calix, and the seeds of the fruit. Depending on their quality, typically the seeds fall into two distinct categories with different commercial values and flotation characteristics. The seeds that are more likely to germinate upon planting tend to be heavier and sink in a conventional water flotation vessel, while the other seeds tend to float with the pulp and the rest of the plant less. Thus, inasmuch as all of these materials (except the heavier seeds) have approximately the same density and floating characteristics, the object is the separation of the pulp and seeds from the rest of the plant.

Figure 1:
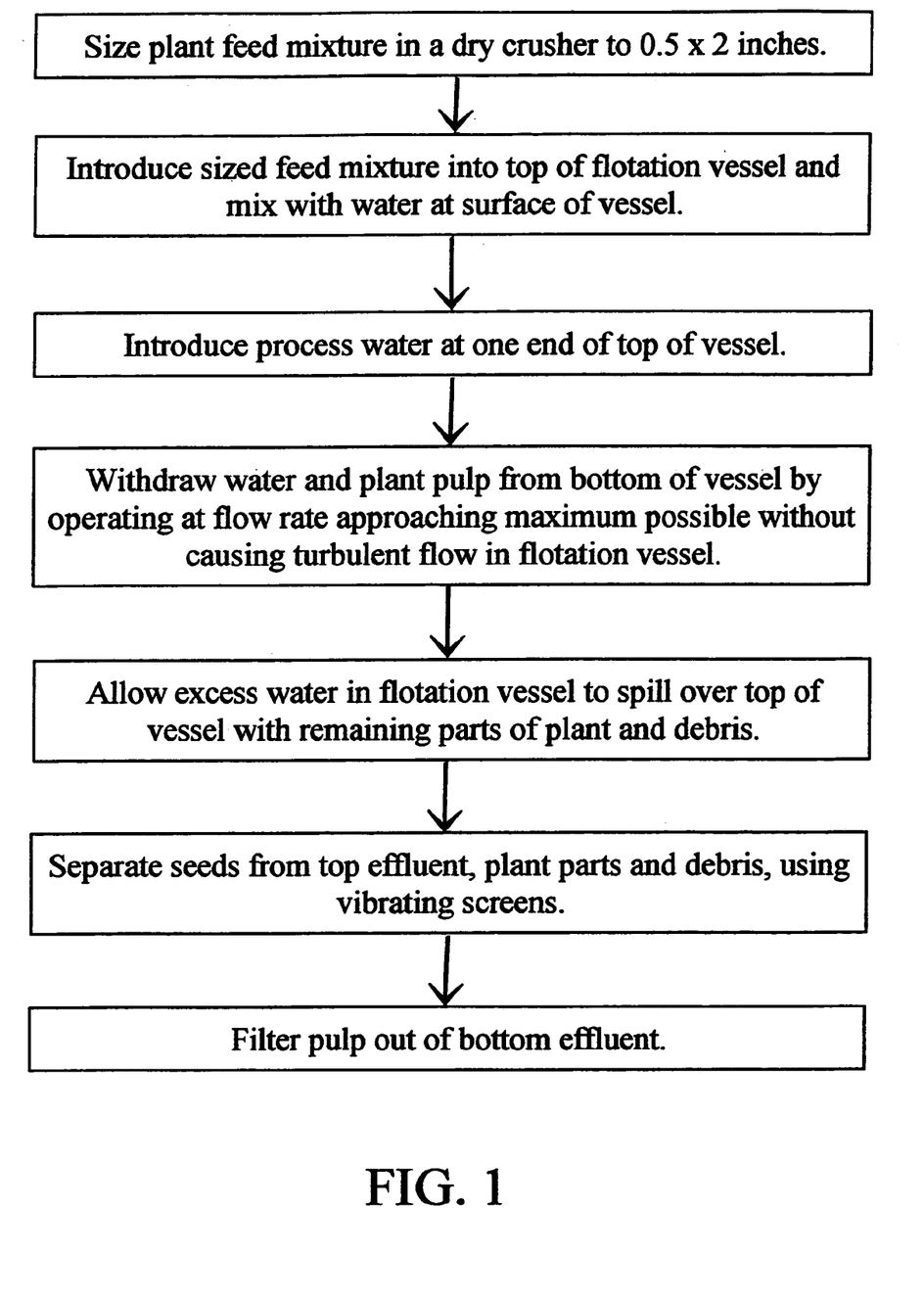
FIG. 1 is a schematic representation of the various steps involved in the flotation process of the invention.

Referring to the drawings, wherein the same numerals and symbols are used throughout to designate like parts, FIG. 1 illustrates schematically the various steps of a flotation process according to the invention. Prior to introduction into the flotation vessel of the invention, the mechanically harvested material is cut in conventional manner into pieces about 0.5 by 2 inches in size. This sizing operation is preferably carried out in a crusher 10 where the dry material collected by a mechanical harvester is introduced at the top and processed by gravity through a sequence of rotary drums, as illustrated schematically in FIG. 2. The products received from the harvest may be pre-sorted mechanically or manually to remove extraneous material, such as metal and plastic, that may have been entrained with the plant material. A screw conveyor (not shown) or a similar machine may then be used to introduce the chili-pepper plant and fruit into the shoot 12 feeding the crusher 10.

Figure 3:
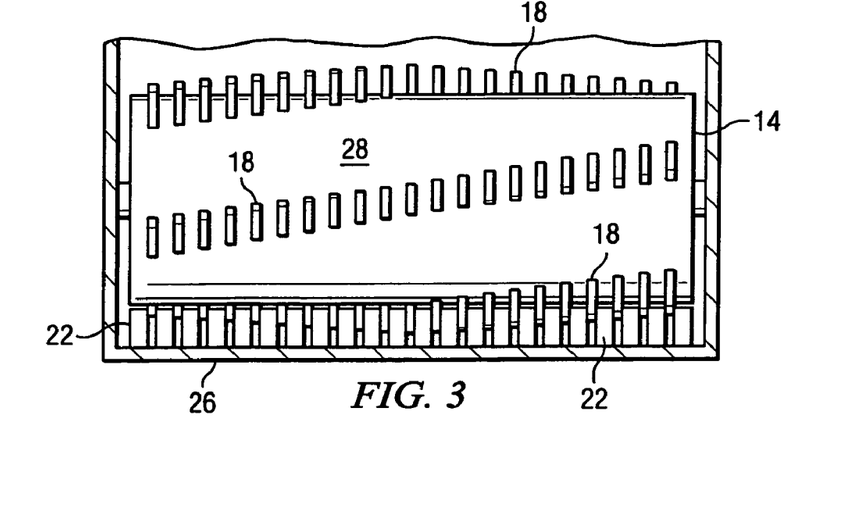
FIG. 3 is a schematic, cut-out top view of the crusher of FIG. 2 to illustrate the relative position of rotating and stationary teeth that mesh to cut to size the plant material to be fed to the flotation system of the invention.

The material is cut by passing it through a sequence of rotating drums 14, 16 equipped with respective teeth 18, 20 that are placed radially along the circumferential surface of the drums and mesh with opposing stationary teeth 22, 24 mounted in the wall 26 of the crusher. Each set of stationary teeth 22, 24 is disposed on the wall 26 of the crusher so as to provide a barrier to the downward flow of material except for the gaps between teeths, which correspond to the position of the rotating teeth 18, 20 on their respective drums 14, 16. FIG. 3 illustrates schematically in top view the position of the rotating teeth 18 along the circumferential surface 28 of the drum 14 and the corresponding position of the stationary teeth 22, with which the rotating teeth mesh as the drum rotates in the crusher 10. The teeth 18 on the drum are preferably mounted along a slanted (non-axial) line in order to promote the downward progression of the material being processed through the gaps between the stationary teeth 22. Inasmuch as the two sets of teeth mesh with close tolerance as the drum rotates, the width and the height of the gaps determine the approximate size of the chunks of material produced by the crusher.

For the purposes of preparing chili-pepper plants for the flotation process of the invention, pieces about 0.5 by 2 inches were found to be preferred. Accordingly, each of the rotating teeth was sized to be about 2 inches tall, ¼ of an inch wide, 2 inches deep (in the direction of travel of the tooth), and disposed at ½-inch gaps. Correspondingly, each of the stationary teeth was about 2 inches tall, ½ inch wide, 2 inches deep, and disposed at ¼-inch gaps. This configuration ensured that each plant piece that passed through the crusher was not substantially larger than 0.5 by 2 inches. The crusher 10 was operated with the first drum 14 revolving at about 1,200 rpm and the second drum 16 at about 2,200 rpm in the same direction.

Figure 4:
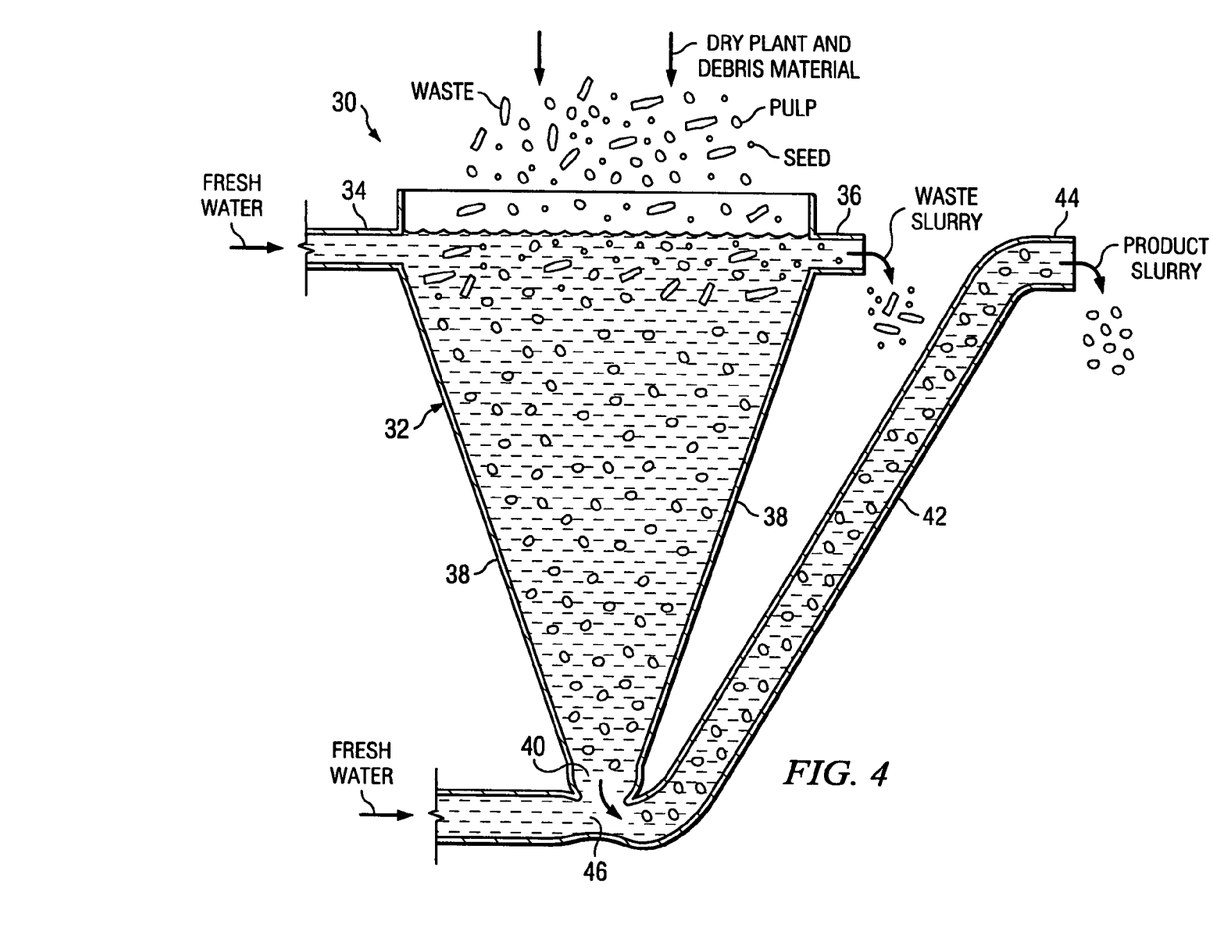
FIG. 4 is a schematic representation of a flotation system according to the invention.

FIG. 4 illustrates schematically a flotation system 30 according to the present invention. The system includes a deep flotation vat or vessel 32 wherein fresh water is fed at the top at a predetermined rate from an inlet port 34 on one side of the vessel and overflow water is allowed to spill over at an opposite side through a waste outlet port or weir 36 that is substantially level with the inlet port 34. A mixer (not shown) is preferably used at the water level to spread out the flotation material. The vessel 32 preferably has sloping walls 38 that converge to an opening 40 at the bottom of the vessel, from where fluid is removed to draw fresh water downward. The fluid flowing out of the vat's bottom is pumped upward through an outer duct 42 toward a product outlet port 44 that is preferably positioned substantially at the same elevation as the level of the water in the flotation vessel.

Figure 2:
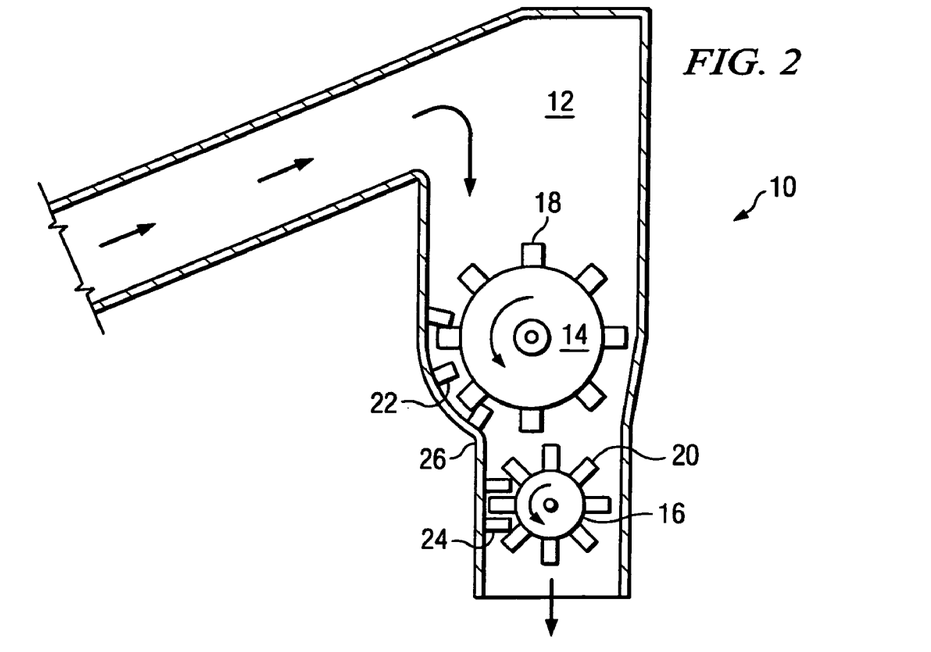
FIG. 2 is a schematic representation, in elevational view, of a rotary-drum crusher suitable to cut to size the raw plant and debris material received from a mechanical harvester in preparation for the flotation separation process of the invention.

The dry plant material sized by the crusher 10 of FIGS. 2 and 3 is fed by gravity into the top of the vat 32 for processing by flotation. The primary object is to separate the pulp of the chili pepper, which is a commercially valuable product, from all other plant and debris ingredients found in the feed, including the seed. The pulp and waste material can subsequently be treated as well to extract the respective fractions of plant seeds, which constitute another valuable product of chili-pepper plants. After numerous unsuccessful attempts to separate the chunks of pulp from the rest of the feed material by flotation while operating at various feed rates of dry material and fresh water as well as at various extraction rates of water from the bottom of the flotation vessel, it was accidentally discovered that the pulp would sink within a very narrow margin of flow conditions that approached the formation of turbulence in the vat. This led to the discovery that the pulp of the pepper can indeed be separated (with the heavier seed fraction) from the rest of the solid material, even though they are very close in density and floating characteristics, so long as the flotation process is carried out under still laminar flow conditions that approach the initial formation of turbulence in the vat.

Thus, according to one aspect of the invention, fresh water is fed to the vat 32 through the inlet port 34 at a rate commensurate with the amount of chili-pepper plant fed from the crusher above. As one skilled in the art of plant-material flotation would readily understand, enough fresh water needs to be provided to make up for the water withdrawal from the bottom opening 40 of the vessel. This rate of withdrawal, in turn, is determined according to the invention by the rate of bottom extraction needed to approach turbulence in the vat which, of course, will depend on the geometry and surface roughness of the vessel components exposed to fluid flow. For example, in a 4-ft deep 150-gallon stainless-steel vessel having a trapezoidal cross-section with lateral sides slanted at an angle of about 55 degrees from vertical and flat front and back sides, as illustrated in FIG. 4, operation near the desired upper limit of laminar flow was obtained with a fresh-water rate of about 125 gallons per minute, a bottom-opening withdrawal rate of about 100 gal/min, and a corresponding overflow rate of about 25 gal/min out of the waste outlet port 36. Under these conditions, the heavier seeds and substantially all of the pulp in the plant material fed at a rate in the 20 to 40 pounds per minute range was successfully separated by flotation from the rest of the material and recovered as a very fluid slurry from the product outlet port 44.

For the purposes of this presentation, the feed plant material is illustrated in FIG. 4 as a collection of particles having different shapes and sizes. The smallest particles are intended to illustrate chili-pepper seeds; the largest chunks represent leaves, stems, placenta and other pieces of debris resulting from the sizing operation; and the intermediate particles represent the pulp of the pepper (in fact the pulp chunks have comparable size to the waste material). As illustrated, when all flow rates are judiciously balanced to produce maximum withdrawal from the bottom opening 40 without causing turbulence in the vessel 32, substantially all chunks of pulp will settle in the vat with the heavier seeds and end up in the product stream delivered at the outlet port 44. At the same time, all lighter seeds and substantially all waste material remain afloat and are carried out by the overflow stream released at the output port 36.

In order to practice the invention, it is essential that the rate of withdrawal from the bottom of the vat 32 be controlled with sufficient precision to enable operation at the limit of laminar flow, as described. To that end, according to another aspect of the invention, the bottom slurry is withdrawn by creating suction with a venturi device placed at the bottom of the opening 40. Water is pumped through the venturi port 46 at a rate sufficiently high to provide the required flow of slurry withdrawal from the vat 32. For example, a water injection rate of about 325 gal/min through a ¾-inch venturi tube produced a withdrawal rate of about 100 gal/min in the example described above. Obviously, these rates are only exemplary and the critical factor to practice the invention remains the objective of producing a laminar flow that is as high as possible without reaching turbulence in the vessel 32. Thus, as expected, the venturi rate of injection for the same system had to be adjusted to accommodate different degrees of moisture in the feed plant material fed to the system. A rate of up to about 400 gal/min through the venturi was necessary to separate very wet feed material, while a rate of only about 250 gal/min proved to be sufficient for very dry feed material. This variation seemed opposite to expectation, but it was found that dry pulp quickly absorbs water and sinks more rapidly than wet pulp even though its original specific gravity is lower. It is noted that the elevation of the product outlet port 44 also affects the injection requirements at the venturi and is preferably selected near the water level in the vat 32. If the outlet were lower, the water in the vat would drain out by gravity when the system is not in operation; similarly, if the outlet were higher, the additional head would have to be overcome by increased flow in the venturi device. Neither alternative would provide any practical advantage.

Figure 5:
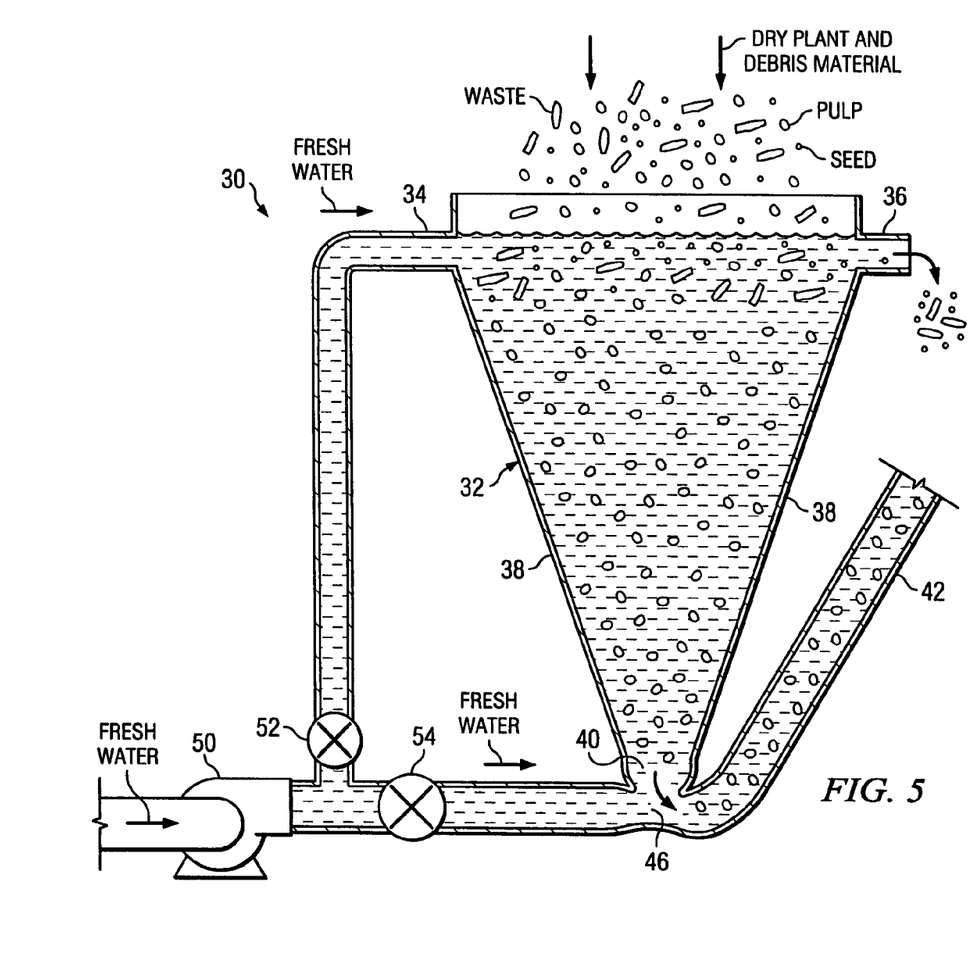
FIG. 5 is a partial view of the flotation system of FIG. 4 showing a single pump and separate control valves to regulate the water flow to the top of the flotation vessel and to the venturi unit at the bottom of the vessel.

In the preferred embodiment of the invention, a single pump 50 is used to provide fresh water both at the inlet port 34 and the venturi port 46, as shown in the partial schematic view of FIG. 5. Two independent valves 52 and 54 are then used to control the water rates to the inlet port 34 and the venturi port 46, respectively.

Figure 6:
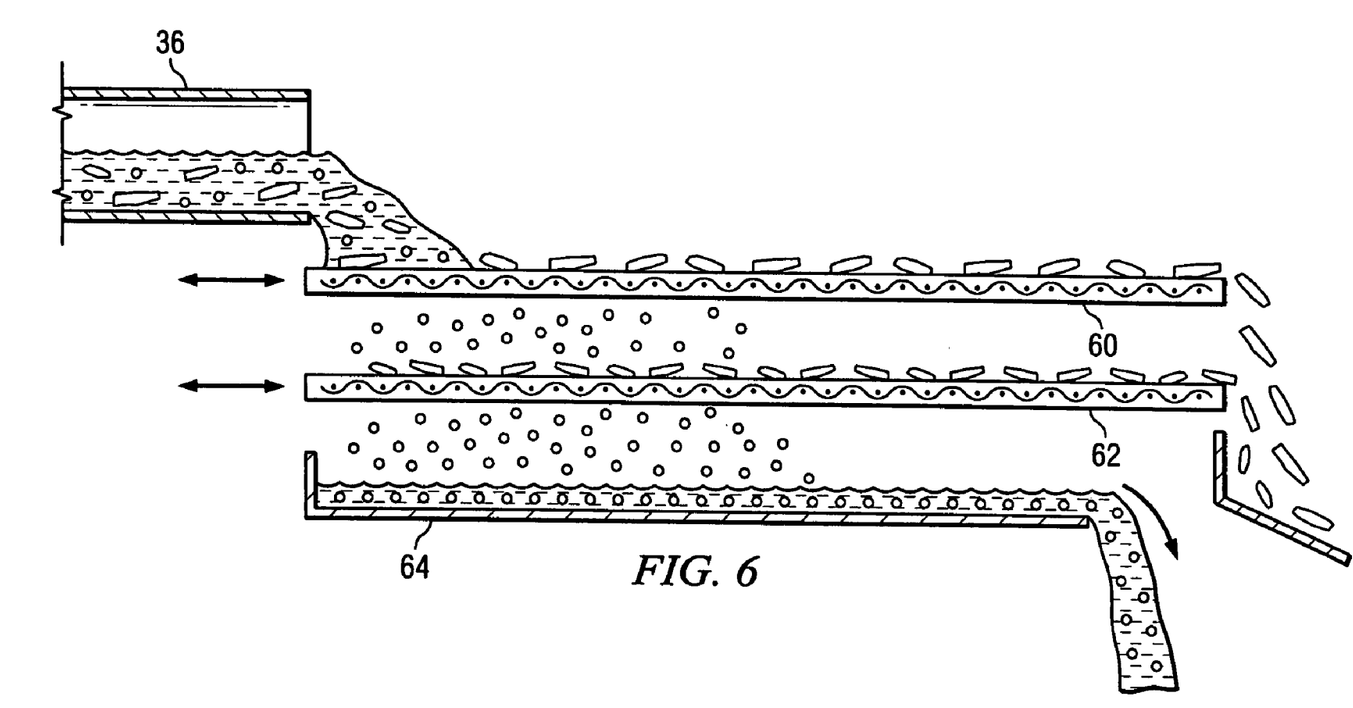
FIG. 6 is a schematic elevational view of an exemplary screen system used for separating chili-pepper seeds from the waste contained in the overflow effluent and the pulp contained in the bottom effluent from the flotation vessel of the invention.

According to yet another aspect of the invention, the effluent from the waste outlet port 36 is processed through a series of vibrating screens to separate the lighter chili-pepper seeds from the waste material. Because of the relatively small size and narrow size range of the seeds and the markedly larger waste material, this conventional separation process is easily achieved with one or two screens, as illustrated in FIG. 6. The effluent from the port 36 is dumped over a first, coarse vibrating screen 60 sized to pass the water with all seeds and retain most of the waste material. If desired, a second, finer vibrating screen 62 may also be used to retain smaller pieces of waste material that may have passed through the coarser screen. The water and seeds are collected in a tray 64 and moved forward for further processing in conventional manner. In practice a coarse screen with 3/16-inch openings a finer screen with 3/32-inch openings are adequate to separate essentially 100 percent of the seed from the waste material. The same type of screen apparatus is used to separate the heavier seeds from the pulp in the bottom effluent. Thus, according to the invention, both the more valuable heavier seeds and the less valuable lighter seeds are not only recovered but are produced in separate streams, which provides the additional advantage of automatically sorting seeds based on their commercial value.

Figure 7:
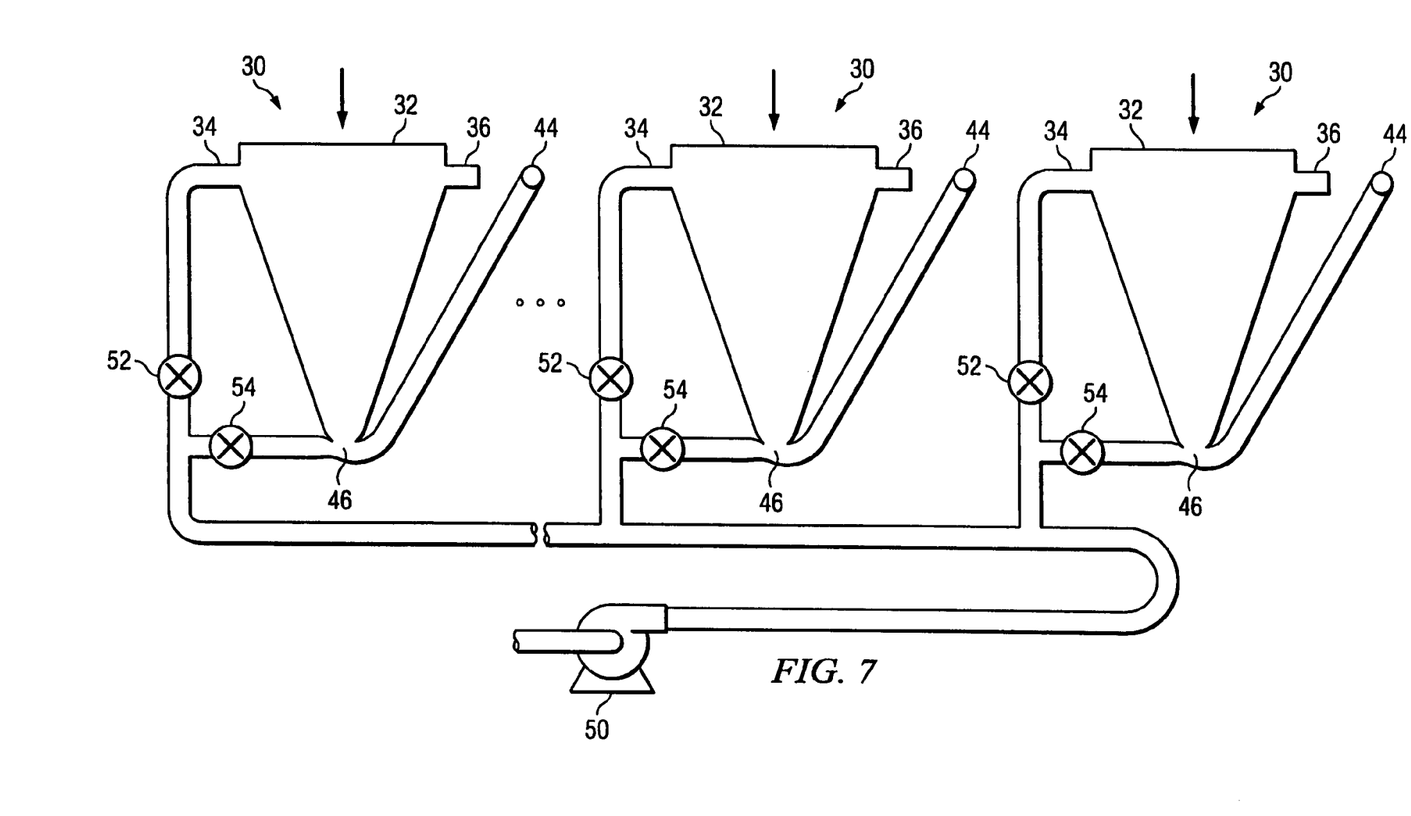
FIG. 7 is a schematic representation of a flotation system wherein several units, as described in FIG. 5, are coupled for independent parallel operation.

Finally, as illustrated schematically in FIG. 7, several flotation systems 30 according to the invention have been successfully coupled for parallel operation. Because of the independent control valves and the separate feed and effluent streams associated with each unit, each may be run independently of the others. A single pump 50 may be used to feed all units in the system. Thus, overall processing demands may be met in an efficient manner by adding or subtracting units 30 from the system without any need to change the operating conditions of other units. As described, optimal conditions for any given unit may be established only by empirical experimentation leading to a balance of flow rates that produces the desired near-turbulent laminar flow in the flotation vessel. Because of the critical importance of maintaining these well defined operating conditions in each unit in order to successfully separate the pulp of chili peppers from the other materials, the ability to remove or bring on line individual units without affecting the operation of the other units provides a great practical advantage.

Various changes in the details, steps and components that have been described may be made by those skilled in the art within the principles and scope of the invention herein illustrated and defined in the appended claims. For example, flotation vessels of different shapes and materials and different forms of conveying water and solid material to and from the flotation vessel could be used in equivalent fashion within the scope of the invention. Similarly, the fresh water and the plant-material feed could be combined prior to introduction to the flotation vessel without affecting the performance of the invention. The common factor for separating plant materials with similar flotation characteristics remains the nature of the downward flow established in the flotation vessel which, as disclosed, is effective only when it approaches but not reach turbulence.

Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method of separating plant materials in a flotation vessel, the method comprising the following steps:
   introducing a feed mixture of said plant materials into the flotation vessel;
   introducing water into the flotation vessel;
   collecting an overflow of water and a floating portion of the feed mixture from the flotation vessel; and
   withdrawing water and a sinking portion of the feed mixture from a bottom of the flotation vessel;
   wherein said withdrawing step is carried out so as to establish a maximum flow rate of withdrawal while maintaining laminar flow in the flotation vessel; and wherein said feed mixture includes chili-pepper plants sized into pieced about 2 inches long or smaller, said sinking portion of the feed mixture includes chili-pepper pulp, said floating portion of the feed mixture includes chili-pepper seeds and chili-pepper plant waste material, and said steps of introducing water into flotation vessel and withdrawing water from the bottom of the flotation vessel are carried out at respective flow rates in an approximate ratio of 5/4.

2. The flotation method of claim 1, further comprising the steps of screening said floating portion and said sinking portion of the feed mixture into different-size fractions.

3. The flotation method of claim 1, wherein said step of withdrawing water from the bottom of the flotation vessel is carried out with a venturi unit, and said maximum flow rate of withdrawal is established using a valve controlling a flow rate of water injected into the venturi unit.

4. The flotation method of claim 2, wherein said step of withdrawing water from the bottom of the flotation vessel is carried out with a venturi unit, and said maximum flow rate of withdrawal is established using a valve controlling a flow rate of water injected into the venturi unit.

5. The flotation method of claim 1, wherein said step of introducing water into the flotation vessel and the step of withdrawing water from the bottom of the vessel are carried out using a common pump.

\* \* \* \* \*